United States Patent Office 2,927,340
Patented Mar. 8, 1960

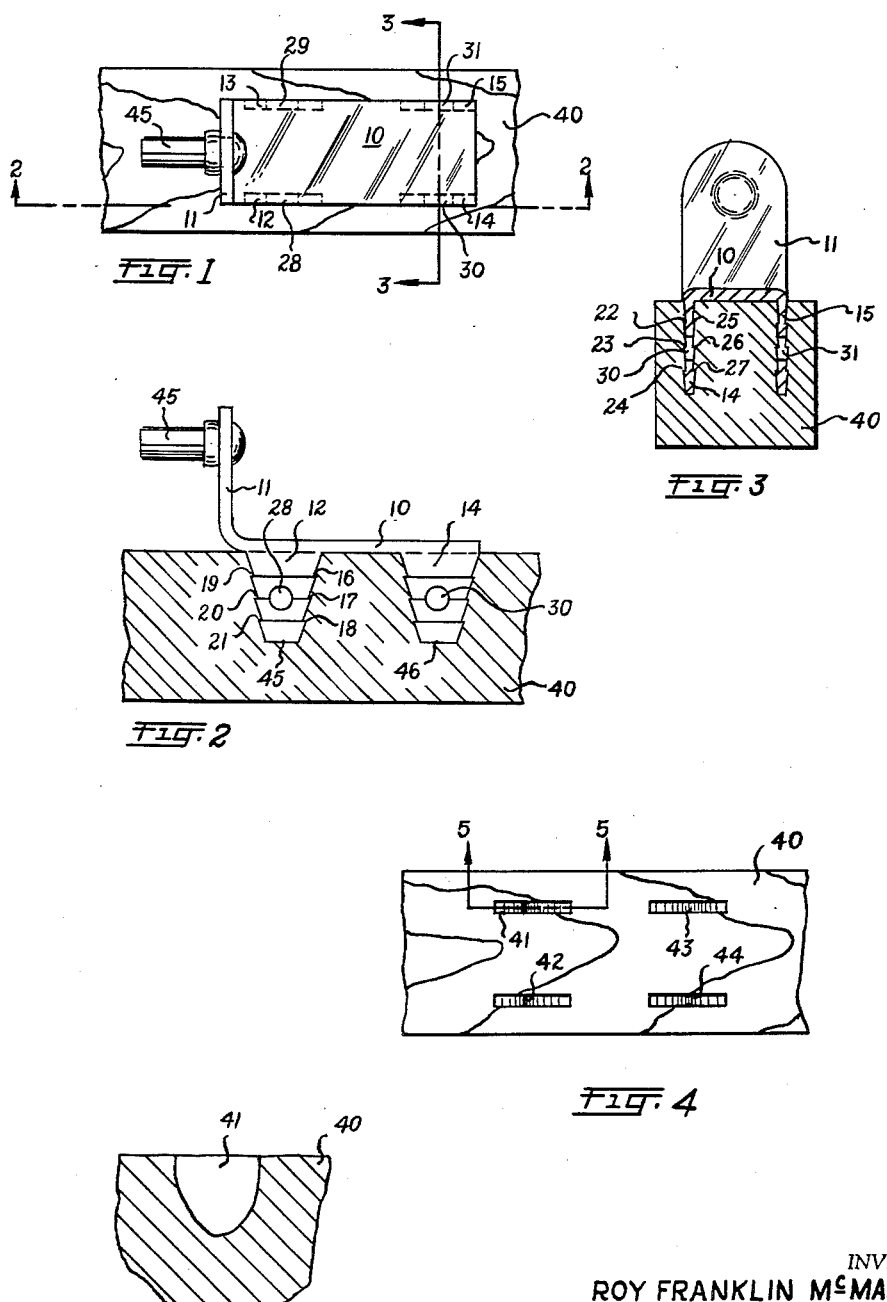

2,927,340

FASTENING

Roy Franklin McMahan, Sr., Louisville, Ky.

Application March 14, 1957, Serial No. 650,061

6 Claims. (Cl. 16—159)

This invention relates to a new and improved staple-type fastening adapted to be pressed into fastening position and, more particularly, to a general purpose fastening having an improved securing action upon the article in which it is embedded.

Various forms of tapered serrated fastenings, such as illustrated by spikes for railway ties; sheet metal staples for containers; or pronged metal strips for building construction, have been proposed heretofore but in general such devices are adapted to serve a particular purpose only and possess definite limitations when adapted for other purposes. The present invention has, among its objectives, the provision of an improved fastening incorporating certain basic features of such known devices, but containing supplemental features permitting the fastening to be adapted for more general usage.

One object is to provide an improved fastening adapted to be permanently secured to a structure and to serve as a fixed or movable mounting for a second structure with respect to the fastened structure.

Another object is to provide a fastening adapted to be secured to a structure jointly by mechanical engagement therewith and by an improved supplemental adhesive engagement therewith.

Another object is to provide an inexpensive staple-type fastening formed from a single blank and having tapered projections serrated on one or more sides.

Another object is to provide a multiple pronged fastening having a rigidity permitting it to be uniformly and rapidly pressed into securing position without deformation.

Another object is to provide a fastening presenting a smooth outer surface devoid of supplemental fastening means such as screws or nails.

Other objects and advantages will become more apparent when the following description is considered in conjunction with the accompanying drawings showing a presently preferred form of fastening embodying my invention.

In the drawings, Fig. 1 is a top plan view of one form of the fastening as secured upon a wooden structure and arranged for fixed mounting to a second structure.

Fig. 2 is a sectional view on line 2—2 of Fig. 1.

Fig. 3 is a sectional view on line 3—3 of Fig. 1.

Fig. 4 is a top plan view of the wooden structure prepared for reception of the fastening.

Fig. 5 is a sectional view of a detail taken on line 5—5 of Fig. 4.

Figure 6:
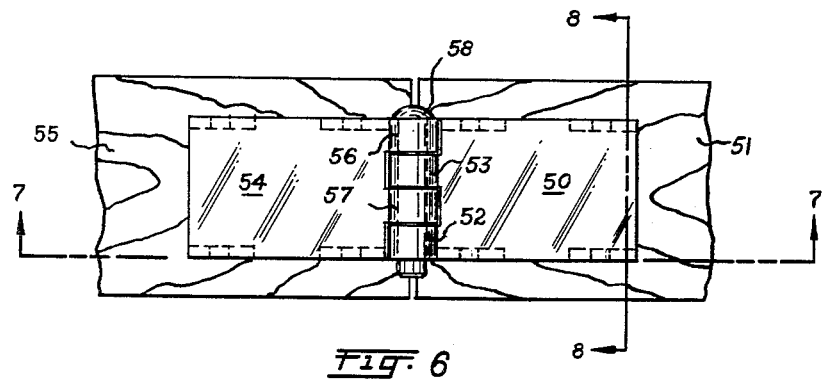
Fig. 6 is a top plan view of a second form of the fastening as secured upon coacting wooden structures and arranged for movable mounting of those structures.

In accordance with the invention, a rigid metallic fastening is intended for insertion under pressure into spaced recesses previously formed in a deformable structural material, such as wood. The fastening has integral, tapered, and serrated projections, or prongs, which are completely embedded in the material and, preferably, contain apertures in which an adhesive is located, thus to form an adhesive reinforcing dowel. While the invention may be employed in the joining of two structures for any desired purpose, it is particularly well suited in furniture construction and especially in furniture, such as demountable cribs for children or other forms of furniture in which no sharp exposed edges of the fastening is permitted.

Referring first to Figs. 1 to 3, one form of the fastening may comprise an elongated flat base plate 10 having one end bent upwardly at 11. At its side edges the base plate has one or more pairs of integral projections or prongs 12, 13, and 14, 15 bent downwardly in a staple-like arrangement into planes normal to the plane of the base plate. When more than one pair of projections is employed, they are suitably spaced from each other to provide for distribution of stress and to avoid splitting of the structure in which they are embedded. Preferably, each projection is formed in the shape of a truncated tooth and has a thickness throughout which is approximately equal to the thickness of the base plate. By reason of this substantial uniformity of thickness, it is more difficult to detach the fastening from the fastened structure than would be the case if such projection were tapered in thickness for ease in insertion in the structure.

Each projection, moreover, is formed with two or more end serrations or grooves, as shown at 16, 17, 18 and 19, 20, 21 having sharply projecting edges. In addition, each projection may be formed with two or more side serrations or grooves on one or both sides, as seen at 22, 23, 24 and 25, 26, 27 in Fig. 3. The depth of such serrations, however, is relatively small in respect to the thickness of the projection and of the base plate. Preferably, the corresponding side and end serrations join each other to form a single ledge encompassing the projection.

As a significant feature of my improved fastening, I also provide one or more holes 28, 29, 30 and 31 in the respective projections, which holes serve to accommodate an adhesive dowel extending between the confronting sides of the mounting recess formed in the structure in which the fastening is to be embedded. In manufacturing the thus described fastening, a flat sheet of metal may be blanked out with suitable dies which form the projections and the serrated ends thereof. By a conventional coining operation between suitable dies, the side serrations on those projections are formed and by a suitable bending operation, the shoulder 11 may be bent upwardly and the four projections may be bent downwardly. It will be understood that the projections need not necessarily be arranged in pairs and that the projections may be offset from each other, if desired.

In assembling the fastening to a structure such as a wooden rail 40 as seen in Figs. 4 and 5, a suitable tool, not shown, serving as a mounting template and having spaced cutting members corresponding in number and location to the projections upon the fastening, is first pressed into the rail and preferably along the grain thereof. Upon removing the tool, a series of generally V-shaped guide recesses 41, 42, 43 and 44 remain in the rail with the fibres of wood adjacent the sides of each recess in a compressed condition. The fastening may then be dipped in a suitable adhesive, such as glue, and centered with its projections disposed in the corresponding recesses in the rail, herein called a first structure. Upon applying a heavy pressure to the base plate, the plate may then be forced into contact with the upper side of the rail, as seen in Fig. 3. This pressure could be applied by striking a tool against the base plate, but preferably is applied by a suitable press mechanism, such as a hydraulic press. The thickness of the base plate is such as to provide rigidity thereto and to resist deformation, as the projections are embedded in the preformed guide recesses. During this assembly the truncated lower edges 45 and 46 of the projections 14 and 15 as seen in Fig. 2, squeeze into the apex of the recesses 42 and 44 carrying glue therewith and also further deform the fibres of the wood so that such fibres spring into the regions above the above described serrations in those projections. In addition, the glue contained in the holes 28 and 30 also forms a bridge between the two inner sides of the respective recesses and when the fastening is permitted to dry, thus forms glued dowels which add a supplemental reinforcing action. Furthermore, by using sufficient glue, the lower side of the flat base plate may be adhesively secured to the top surface of the secured structure.

For the purpose of connecting the fastening and the first structure fastened thereto, in rigid relation to a second structure, I provide a suitable rod 45 or other means in fixed relation to the shoulder 11 of the base plate. This rod is adapted to fit into any suitable slot or aperture in the second structure, not shown, and preferably projects substantially parallel to the main portion of the base plate.

Figure 7:
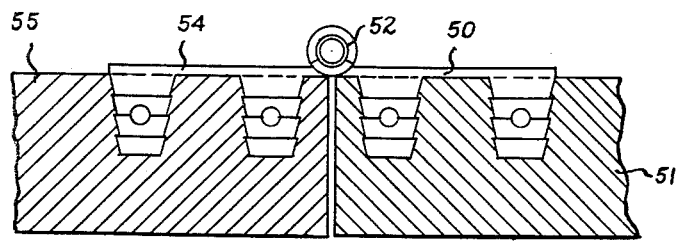
Fig. 7 is a sectional view on line 7—7 of Fig. 6.
Figure 8:
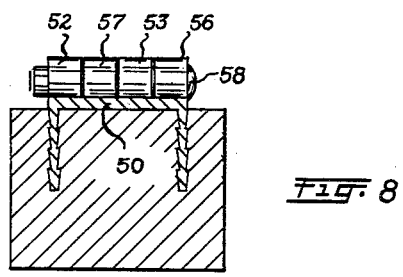
Fig. 8 is a sectional view on line 8—8 of Fig. 6

Referring now to Figs. 6 to 8, a fastening of the type described having a base plate 50 may be affixed to a first structure 51 and may be formed with the end of the plate in the shape of spaced and curved hinge portions 52 and 53 integral with the base plate. A companion fastening of the same type having a base plate 54 may be affixed to a second structure 55. This companion fastening may conveniently be identical with the first fastening (being reversed, as seen in Fig. 6) and may be formed with the end of the plate in the shape of spaced and curved hinge portions 56 and 57 integral with the base plate. A conventional hinge pintle 58 may be inserted through the respective hinge portions for the purpose of connecting the two fastened structures in mountable relation to each other. As indicated, the respective fastenings preferably are provided with serrated projections as above described, having holes therethrough for the reception of adhesive.

Having thus described two embodiments of the fastening, the advantages of the same for general purpose usage will be evident to those skilled in the art. To recapitulate, the entire fastening is formed of one piece of metal by simple metal working operations, no exposed portions of the fastening contains sharp edges, no supplemental screws or nails are employed, the mounting of the fastening is by a simple pressing operation wherein the fastening is positioned by means of previously formed guide recesses, and the permanent securing action afforded by the serrated projections is further reinforced by the flued dowel-like action. While the fastening is useful in wooden furniture construction, it may also be used wherever two structures are to be assembled and wherein one of the structures is of a material in which the fastening can be inserted.

In accordance with the patent statutes, I have described what, at present, are considered to be the preferred embodiments of my invention, but it will be obvious to those skilled in the art that various changes and modifications can be made therein without departing from the true scope and spirit of the invention and I therefore aim to cover, in the appended claims, all such equivalent variations and modifications.

What I claim as new and desire to secure by Letters Patent of the United States is:

1. A fastening for attachment to a first structure and comprising a rigid, one-piece flat base plate having a substantially smooth upper surface, a plurality of serrated tapered projections extending downwardly from each of the side edges of said plate and located at equal distances from the longitudinal center line of said plate each of said projections being disposed in a plane normal to the plane of said plate, said projections being integral with said plate and adapted to be fully embedded in said first structure and having a thickness substantially equal to the thickness of said base plate whereby the serrations resist withdrawal of said projections from embedded position, and means attached to said base plate at one end thereof for joining said fastening to a second structure.

2. A fastening as defined in claim 1 wherein each of said projections has a plurality of spaced serrations extending around the periphery of said projection.

3. A fastening as defined in claim 1 wherein each of said projections is formed in the shape of a truncated tooth.

4. A fastening as defined in claim 1 wherein said means for attaching said fastening to said second structure comprises a member rigidly affixed to an upstanding shoulder on said base plate.

5. A fastening as defined in claim 1 wherein said means for attaching said fastening to said second structure comprises a portion of a hinge.

6. A fastening for attachment to a first structure and comprising a rigid, one-piece flat base plate having a substantially smooth upper surface, a plurality of serrated tapered projections extending downwardly from each of the side edges of said plate, and located at equal distances from the longitudinal center line of said plate each of said projections being disposed in a plane normal to the plane of said plate, said projections being integral with said plate and adapted to be fully embedded in said first structure and having a thickness substantially equal to the thickness of said base plate whereby the serrations resist withdrawal of said projections from embedded positions, an aperture extending transversely of each of said projections for containing an adhesive, and means attached to said base plate at one end thereof for joining said fastening to a second structure.

References Cited in the file of this patent

UNITED STATES PATENTS

| 181,843 | Hapgood | Sept. 5, 1876 |

FOREIGN PATENTS

| 14,140 | Great Britain | 1915 |
| 33,874 | Switzerland | May 30, 1905 |
| 48,076 | Austria | May 26, 1911 |
| 556,232 | Germany | Aug. 5, 1932 |
| 991,214 | France | June 20, 1951 |